United States Patent [19]

Torras

[11] Patent Number: 4,700,536

[45] Date of Patent: Oct. 20, 1987

[54] MOWER WITH IMPACT RESISTANT CONNECTION

[75] Inventor: Robert M. Torras, St. Simons Island, Ga.

[73] Assignee: Kut Kwick Corporation, Brunswick, Ga.

[21] Appl. No.: 725,935

[22] Filed: Apr. 22, 1985

[51] Int. Cl.$^4$ .............................................. A01D 34/04
[52] U.S. Cl. ...................................... 56/15.8; 56/209; 56/17.1
[58] Field of Search ...................... 56/14.9, 15.1, 15.2, 56/15.8, 17.1, 17.2, DIG. 10, DIG. 22, 15.9, 16.2, 208, 209

[56] References Cited

U.S. PATENT DOCUMENTS

| | | | |
|---|---|---|---|
| 2,596,641 | 5/1952 | Bert et al. | 56/15.8 |
| 3,375,645 | 4/1968 | Miller | 56/15.8 |
| 3,748,839 | 7/1973 | Auis | 56/15.8 |
| 4,253,295 | 3/1981 | Knepper | 56/16.2 |
| 4,313,295 | 2/1982 | Hansen et al. | 56/15.8 |
| 4,325,211 | 4/1982 | Witt et al. | 56/15.8 |

FOREIGN PATENT DOCUMENTS 111222  7/1944  Sweden ................................. 56/16.2

OTHER PUBLICATIONS

Kut-Kwick Corp., Instruction Manual, model SM 2301, HM 2301-*Cutter Housing Removal*, 1-2-80, 2 pages.

*Primary Examiner*—Gene Mancene
*Assistant Examiner*—Cary E. Stone
*Attorney, Agent, or Firm*—Thomas & Kennedy

[57] ABSTRACT

A self propelled riding mower includes a power unit (11) that pushes its cutter unit (12), and the units are connected together by an impact resistant pivot connection (25) which permits the cutter unit to pivot with respect to the power unit when travelling over uneven terrain. The pivot connection includes or is supplemented by bumpers (44, 45) carried by one unit in an array about or straddling the pivot bar (40) and pivot tube (58), and a bumper plate or plates (55) carried by the other unit that is or are maintained in sliding relationship with the bumpers.

10 Claims, 6 Drawing Figures

1

MOWER WITH IMPACT RESISTANT CONNECTION

BACKGROUND OF THE INVENTION

FIELD OF THE INVENTION

This invention relates to self propelled riding mowers for cutting grass and the like, whereby the cutter unit is positioned in front of the power unit, and the cutter unit and power unit are pivotably connected together. The mower can maintain its cutter blades approximately parallel to the ground surface when the mower is traversing uneven terrain by the cutter unit pivoting with respect to the power unit.

More particularly, the invention relates to an impact resistant pivot connection between the power unit and the front pivotable cutter unit of a mower, whereby if the cutter unit as it is being pushed by the power unit abruptly engages an obstacle in its path, the twisting forces imparted between the cutter unit and power unit are resisted so as to minimize the damage and wear applied by such forces to the pivot connection between the cutter unit and power unit.

DESCRIPTION OF THE PRIOR ART

Various self propelled, riding mowers have been developed in the past for cutting grass and other vegetation. In general, the larger mowers are constructed in three configurations: with the cutter unit pulled behind the tractor or power unit; with the cutter unit placed between the forward and rear wheels of the power unit; and with the cutter unit positioned in front of the power unit. Some mowers are constructed with heavy cutter and power units for high speed operation. The heavier weight of the mower enables the cutter unit to absorb the abuse of the terrain over which it operates as well as impacts of the cutter unit against objects in the mowing path. The heavier the cutter unit, the less the unit will bounce off the ground during high speed mowing.

It is desirable to have the cutter unit follow the contour of the ground rather than have it stay in the same plane as the power unit. This is accomplished by using various types of floating cutter units. One type of floating cutter unit for out front rotary mowers is fixed rigidly to the power unit, front to back, while pivoting to the side to adjust to the slope of the ground. This type of movement can be accomplished by a cutter unit that is supported by front caster wheels which support part of the weight of the power unit. This construction allows a shortened overall length of the entire machine and permits the cutter unit to be of heavier than normal construction and weight. The cutter unit can, through this design, be made heavy enough to absorb impacts and carry massive blade support assemblies, and have the mass to allow more efficient rear discharge of the plant cuttings. Further, it has been found that mowers having cutter units mounted in front of the power units, with a pivotal connection between the two, operate better on sloped terrain where the mower must travel long distances horizontally across a sloped surface, such as along the sloped enbankment adjacent a highway, as well as when the mower must reverse its direction of travel when operating on a sloped surface.

When mowing horizontally along a sloped enbankment, the front portion of the mower usually is maintained at an angle extending slightly up the incline of the enbankment, with the rear wheels tending to drive the mower up the embankment so that the mower moves in a crab-like manner along the enbankment. This is necessary in order to overcome the tendency of the front cutter unit to nose down hill. When a slope mower must reverse its direction on a steep slope, preferably the cutter unit is swung sideways in an arc about the power unit. This turning maneuver can be accomplished best with a side pivoting cutter unit, where the front cutter unit is pivotally mounted about a longitudinal axis with respect to the rear power unit, with caster wheels supporting the front cutter unit and with rear driving wheels controlling the direction of movement of the mower. If the mower is the type that has its front cutter unit rigidly but pivotally mounted to its rear power unit with the units supporting each other through a pivotal connection, the cutting blades of the cutter unit can be maintained closer to a parallel attitude with respect to the ground surface and the mower is more easily operated on sloped terrain.

On both the slope type as well as the general purpose type mower that is constructed with an out front cutter unit, one of the structures utilized for forming the pivotal connection between the cutter unit and the power unit mower is a telescoped arrangement between a support bar mounted to one unit and a support tube mounted to the other unit, with the support tube surrounding the support bar. The support bar is mounted with its longitudinal axis extending along the center line of the mower, which allows the cutter unit to pivot about the axis with respect to the power unit.

While this type and other types of connections function to provide the proper pivoting and supporting relationship between the power unit and the cutter unit, the pivotal connection of a mower is subject to deterioration and damage when the mower is inadvertently driven into an obstruction, as when the cutter unit engages a post, tree, stump, rock, hole, etc. as it is pushed by the power unit. The obstruction will abruptly retard the forward movement of the mower, and the forces of impact are transmitted from the cutter unit through the pivotal connection to the power unit. When the obstruction is off set from the axis of the pivotal connection between the power unit and the cutter unit, the forces of impact tend to bend the pivotal connection between the cutter unit and power unit. Repeated engagement with such obstructions eventually will cause the pivotal connection to deteriorate and fail.

SUMMARY OF THE INVENTION

Briefly described, the present invention comprises a mower with an impact resistant pivotal connection structure positioned between the power unit and the cutter unit which tends to minimize the deterioration of the pivotal connection between the power unit and the cutter unit when the cutter unit engages an obstruction as it is being propelled by the power unit. The pivotal connection includes, for example, a telescoped bar and tube pivotal mounting assembly, with the tube connected to one of the units and bar connected to the other of the units, whereby the units can pivot with respect to one another about a longitudinal pivot axis, and impact resistant bumpers positioned between the power unit and the cutter unit and straddling the pivot axis. The bumpers of the cutter unit and power unit are arranged in facing relationship and are large enough so as to overlap each other when the cutter unit is pivoted with respect to the power unit, so that even when the cutter unit is pivoted with respect to the power unit and engages an obstruction, the bumpers will resist the twisting movement of the cutter unit with respect to the power unit, which tends to avoid damage to the pivotal connection between the units.

Thus, it is an object of this invention to provide a mower with a power unit and a front mounted cutter unit and an impact resistant pivotal connection between the power unit and the cutter unit, with the pivotal connection being resistant to bending forces and deterioration from engagement by the cutter unit with obstructions.

Another object of this invention is to provide a pivotal connection for mounting between a rear power unit and a front cutter unit of a self propelled mower, with the pivotal connection allowing the cutter unit to pivot with respect to the power unit during movement of the mower over uneven terrain, and with the pivotal connection being durable and resistant to twisting forces applied by impact of the cutter unit with an obstruction, even when the cutter unit is pivoted with respect to the power unit.

Another object of this invention is to provide an improved pivotal connection for mounting between the front mounted cutter unit and a rear mounted power unit of a mower that avoids separation of the power unit and the cutter unit due to the cutter unit attempting to assume an extreme angle with respect to the power unit or due to pulling forces applied to the cutter unit.

Other objects, features and advantages of this invention will become apparent upon reading the following specification, when taken in conjunction with the accompanying drawings.

DETAILED DESCRIPTION

The following description is of a mower having its front mounted cutter unit rigidly but pivotably mounted to the rear mounted power unit, in which the units support each other through their pivotal connection; however, the same or similar type connections can be utilized between self supporting power units and their cutter units, or self supporting cutter units and their power units.

Figure 1:
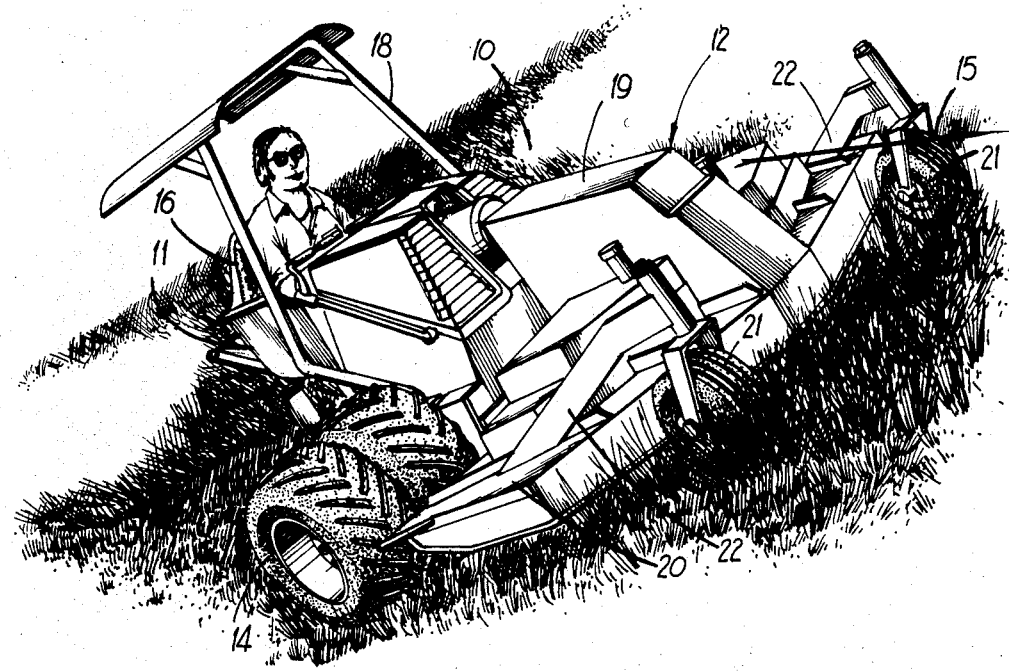
FIG. 1 is a perspective illustration of a mower as it is operated on sloped terrain.

Referring now in more detail to the drawings, in which like numerals indicate like parts throughout the several views, FIG. 1 illustrates a mower 10 that includes a tractor or power unit 11 and a cutter unit 12 mounted in front of the power unit. Power unit 11 includes one or two wheels 14 mounted on each side of a chassis and engine (not shown), with the wheels aligned on a common axis and arranged to drive the power unit and the cutter unit in a forward direction as indicated by arrow 15. The power unit includes a seat 16 on which the operator sits while he operates the mower, an optional roll bar 18 and various controls (not shown) that are manipulated by the driver to operate the power unit. A power take off shaft (not shown) extends forwardly from the power unit 11 toward the cutter 12, through the shaft guard 19 of the cutter unit. The power take off shaft is operated by the engine of the power unit 11 and is connected through sheaves and pulleys to the cutting blades (not shown) that extend parallel to the ground beneath the decking 20 of the cutter unit 12.

Caster wheels 21 are located in front of cutter unit 12 and are mounted to the cutter unit by wheel support brackets 22. The caster wheels 21 and the driving wheels 14 function as the sole support of the mower 10. The height at which the cutter unit is supported by the caster wheels 21 can be adjusted by the placement of spacers (not shown) about the upright pivot shaft of the caster wheels, between the wheels and their support brackets 22.

Figure 2:
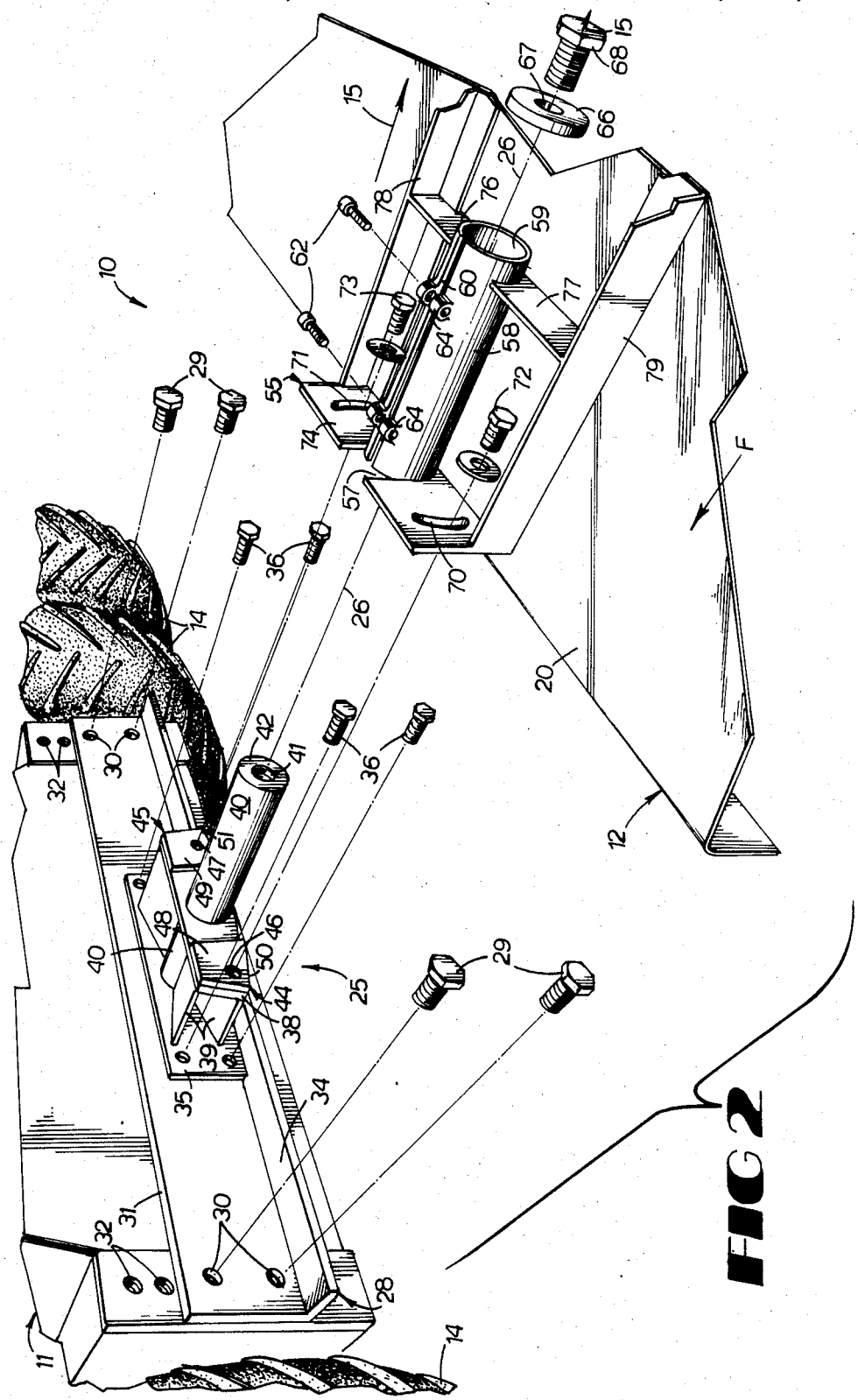
FIG. 2 is an exploded perspective illustration of the pivotal connection between the power unit and the cutter unit of the mower.

As illustrated in FIG. 2, the impact resistant pivotal connection 25 of mower 10 is mounted between power unit 11 and cutter unit 12 and functions to rigidly support the units together about a longitudinal pivot axis 26, which permits the cutter unit 12 to pivot with respect to the power unit 11, but which supports the units from each other. Support bar assembly 28 is mounted to the framework of power unit 11 by means of removable bolts 29 that extend through the openings 30 of the upright flange 31 of the support bar assembly 28 and into an opening of the several vertically spaced openings 32 of the framework of the power unit 11. The several openings 32 permit the support bar to be raised or lowered on the power unit, thereby raising or lowering the rear portion cutter unit with respect to the power unit. The lower platform 34 of support bar assembly 28 helps to form a support for the base plate 35. Base plate 35 is attached to support bar assembly 28 by its bolts 36 that extend through openings in the base plate 35 and through aligned openings of the upright flange 31 of the support bar assembly 28. Pivot bar 40 has one of its ends in abutment with base plate 35, with the pivot bar 40 extending forwardly from the power unit along pivot axis 26. Limit plate 38 is oriented parallel to base plate 35 and support gussets 39 are rigidly mounted between base plate 35, limit plate 38 and pivot bar 40 so that these elements remain in rigid relationship with respect to each other.

Pivot bar 40 includes a centrally positioned threaded bore 41 at its distal end surface 42. Bumpers 44 and 45 straddle or are mounted in an array on opposite sides of pivot bar 40 to the forward facing surface 46 of limit plate 38 and project forwardly from limit plate 38 to allow relief from the weld fillet around pivot bar 40. The bumpers 44 and 45 are fabricated of steel and are rigidly mounted to limit plate 38 by means of welding or other conventional connection means. Threaded bores 46 and 47 are formed through the forward facing surfaces 48 and 49 of the bumpers. The forward facing surfaces 48 and 49 are flat and are oriented perpendicular to the pivot axis 26. The lower edge surfaces 50 and 51 of bumpers 44 and 45 are sloped upwardly and outwardly, and the end portions of the lower edges of limit plate 48, such as the lower edge portion 52 of FIG. 3, are similarly shaped, in that they extend upwardly and outwardly and are coextensive with the lower edge of the bumpers 44 and 45.

Bumper plate 55 is rigidly mounted to decking 20 of cutter unit 12 and is oriented parallel to limit plate 38. The rearwardly facing surface 56 of bumper plate 55 is flat and is to be oriented parallel to and in juxtaposition with the foward facing surfaces 48 and 49 of bumpers 44 and 45. Pivot tube 58 defines a cylindrical bearing surface 59 that extends therethrough, and a slot 60 extends from end to end of the pivot tube. Pivot tube 58 extends perpendicular to bumper plate 55 and is aligned with an opening 57 through the bumper plate. The cylindrical bearing surface 59 of pivot tube 58 is sized and shaped so as to correspond to the external convex surface of pivot bar 40, so that when the cutter unit 12 is to be mounted to the power unit 11, pivot bar 40 extends through bumper plate 55 and pivot tube 58. Adjusting screws 62 fit through threaded bosses 64 mounted on opposite sides of slot 60 of pivot tube 58, so that rotation of adjusting screw 62s results in the cylindrical bearing surface 59 becoming larger or smaller so as to fit properly about pivot bar 40.

Keeper plate 66 defines central opening 67 therethrough, and connecting bolt 68 extends through the opening 67 of plate 66, and into the threaded bore 41 of pivot bar 40. Keeper plate 66 engages the forward surface of pivot tube 58 and when the threaded shank of the connecting bolt is received in the bore 41, rotation of the bolt draws the pivot bar 40 into pivot tube 58, causing the flat forward facing surfaces 48 and 49 of bumpers 44 and 45 to be drawn against the rearwardly facing surface 56 of bumper plate 55. When mounted in this arrangement, cutter unit 12 is rigidly mounted to power unit 1 but is pivotable about pivot axis 26 with respect to power unit 11.

Figure 3:
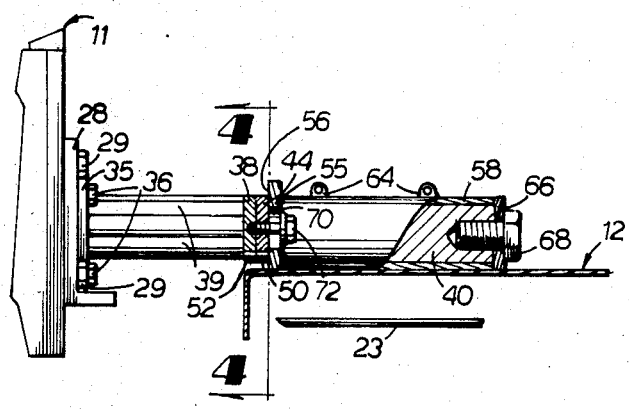
FIG. 3 is a cross sectional illustration of the pivotal connection between the power unit and the cutter unit.
Figure 4:
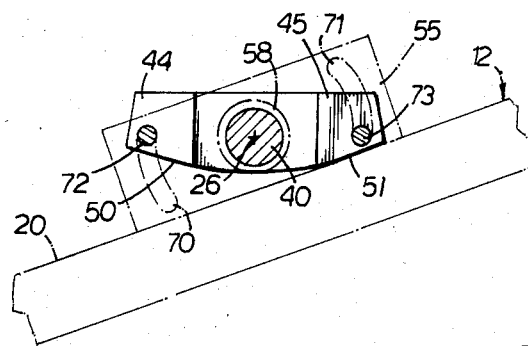
FIG. 4 is an elevational view of the pivotal connection, taken along lines 4—4 of FIG. 3, showing the portions of the pivotal connection that are mounted to the cutter unit in dashed lines so as to illustrate the portions of the power unit that are located behind the portions of the cutter unit.

As illustrated in FIGS. 2, 3, and 4, arcuate slots 70 and 71 are formed through bumper plate 55, with the radius of the slot extending from the longitudinal axis of cylindrical bearing surface 59, which is the same as pivot axis 26. Bolts 72 and 73 extend from the forward face 74 of bumper plate 55 through slots 70 and 71 and are threaded into threaded bores 46 and 47 of bumpers 44 and 45. In addition to bolt 68, bolts 72 and 73 function as secondary safety keepers, with bolt 69 and keeper 66 performing the primary function of maintaining bumper plate 55 in juxtaposition with respect to the forward facing surfaces 48 and 49 of bumpers 44 and 45, which holds the cutter unit 12 and power unit 11 together. Preferably, slots 70 and 71 that extend through bumper plate 55 each extend through an arc of 40°, 20° on either side of level orientation of cutter unit 12 with power unit 11.

As illustrated in FIG. 4, when cutter unit 12 is pivoted, the keeper bolts 72 and 73 move close to the ends of their respective arcuate slots 70 and 71. Normally, the pivoting movement of the cutter unit 12 with respect to the power unit 11 is stopped by the sloped bottom surfaces 50 and 51 of bumpers 44 and 45 engaging the top surface of decking 20. This avoids shear forces being supplied to bolts 72 and 73. Although FIG. 4 illustrates the cutter unit 12 having been pivoted counter clockwise, it will be understood that the cutter unit can be pivoted tilted to the same degree in a clockwise direction.

Bumper plate 55 and pivot tube 58 receive additional support from support struts 76 and 77 attached to pivot tube 58 and from additional struts 78 and 79 attached to elements 76 and 77 and to bumper plate 55. All of the elements 55, 76, 77, 78 and 79 are rigidly mounted to the decking 20 of cutter unit 12. With this arrangement, bumper plate 55 and pivot tube 58 are maintained in rigid relationship on the upper surface of decking 20.

It will be understood from the structure illustrated in FIG. 2 that when the cutter unit 12 is driven in a forward direction by power unit 11 as indicated by arrow 15 and the cutter unit inadvertently engages an obstruction such as a tree stump, and if the point of engagement of the tree stump with respect to the cutter unit 12 is offset from pivot axis 26, a bending force, such as force F, is applied to cutter unit 12. Force F, being displaced to one side of pivot axis 26, applies a bending stress to the impact resistant pivotal connection 25 between power unit 11 and cutter unit 12. The force is resisted by the rear surface 56 of bumper plate 55 engaging the forward facing surface 48 of bumper 44, as well as by bearing surface 59 of pivot tube 58 engaging the external surface of pivot bar 40. The engagement by bumper plate 55 with bumper 44 tends to absorb a major portion of the force F that is transmitted between cutter unit 12 and power unit 11, which avoids having this force absorbed by and possibly damaging pivot bar 40 and pivot tube 58.

Figure 5:
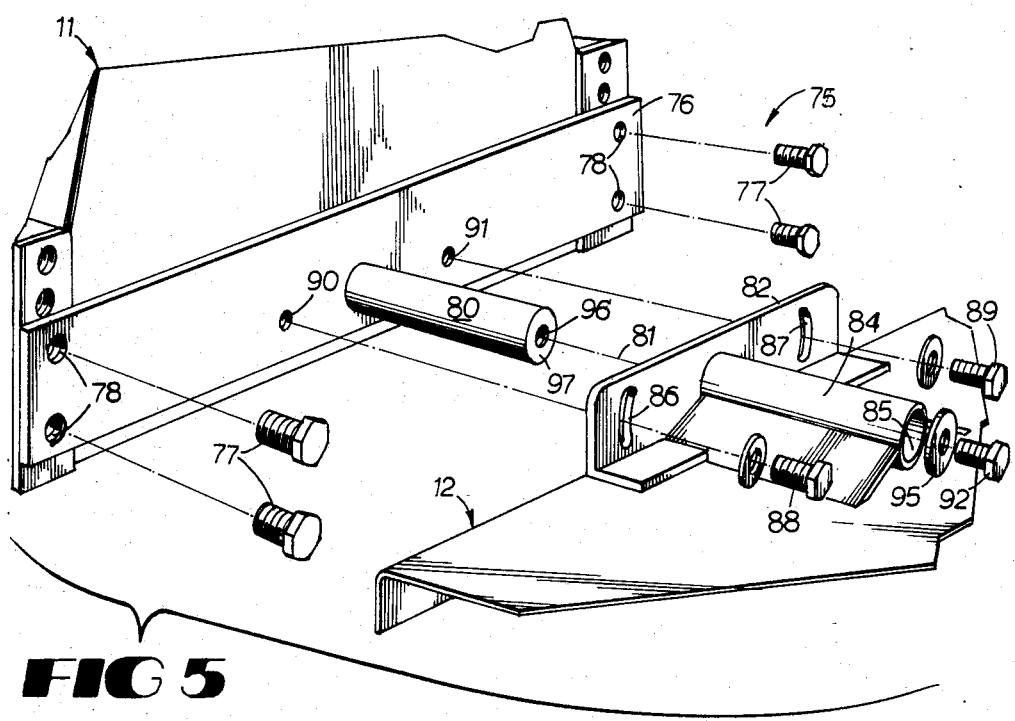
FIG. 5 is an exploded perspective illustration of a second embodiment of the pivotal connection.

FIG. 5 illustrates an alternate embodiment 75 of the impact resistant pivotal connection which is suitable for relatively light weight mowers. Base plate 76 is mounted to the framework of power unit 11 by connectors such as bolts 77 extending through the openings 78 of the base plate, and pivot bar 80 is attached at one end to and extends forwardly from base plate 76 along the pivot axis 81 of the mower. Bumper plate 82 is rigidly mounted to the decking of cutter unit 12, and pivot tube 84 has its rear end surface in abutment with the forward facing surface of bumper plate 82. An opening (not shown) through bumper plate 82 is in alignment with the annular bearing surface 85 of pivot tube 84. Arcuate slots 86 and 87 are formed through bumper plate 82, with the center of the arcs of the slots 86 and 87 located at the pivot axis 81. Keeper bolts 88 and 89 extend through arcuate slots 86 and 87 and are threaded into the internally threaded openings 90 and 91 of base plate 76.

The keeper bolts 88 and 89 maintain the rearwardly facing flat surface of bumper plate 82 in parallel sliding juxtaposition with respect to the forward facing flat face of base plate 76. In addition, bolt 92 extends through the opening of keeper plate 95 and is threaded into the internally threaded bore 96 formed through the distal surface 97 of pivot bar 80, which draws the pivot bar 80 into pivot tube 84 and holds together the facing bearing surfaces of base plate 76 and bumper plate 82. The slots 86 and 87 permit cutter unit 12 to pivot with respect to power unit 11 until the keeper bolts 88 and 89 reach the ends of the arcuate slots, whereupon further pivoting is terminated.

Figure 6:
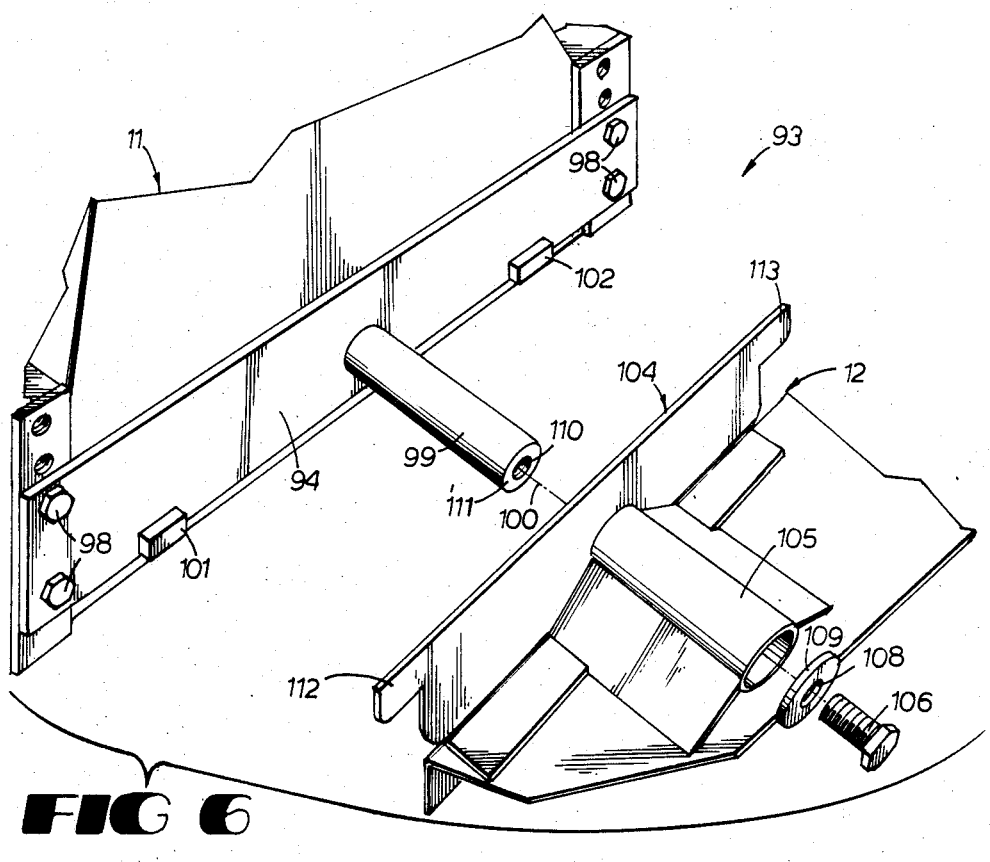
FIG. 6 is an exploded perspective illustration of a third embodiment of the pivotal connection.

FIG. 6 illustrates a third embodiment 93 of the impact resistant pivotal connection that can be mounted between power unit 11 and cutter unit 12. In this embodiment the base plate 94 is mounted by bolts 98 to the framework of power unit 11, and pivot bar 99 extends forwardly from the forwardly facing flat surface of base plate 94, along the pivot axis 100. Stop protrusions 101 and 102 are located at the lower corners of base plate 94.

Bumper plate 104 is rigidly mounted to the decking of cutter unit 12, and its rearwardly facing flat surface is to be mounted parallel to and in juxtaposition with respect to the forward facing flat surface of base plate 94. Pivot tube 105 has its rearward end mounted in abutment with bumper plate 104 and in registration with an opening (not shown) which extends through the bumper plate, so as to receive pivot bar 99 therethrough. Bolt 106 extends through the opening 108 of keeper plate 109 and into the internally threaded bore 110 formed through the distal surface 111 of pivot bar 99. This draws the pivot bar 99 and the pivot tube together in telescoped relationship, and urges the facing surfaces of base plate 94 and bumper plate 104 together. Laterally extending protrusions 112 and 113 of bumper plate 104 overhang stop protrusions 101 and 102 of base plate 94. When cutter unit 12 is pivoted about pivot axis 100 with respect to power unit 11, one of the overhanging protrusions 112 or 113 will engage one of the stop protrusions 101 or 102 so as limit the amount of tilt.

As with the embodiment illustrated in FIGS. 1-4, the embodiments illustrated in FIGS. 5 and 6 tend to resist the bending forces applied to the pivot bars 80 and 99 by virtue of the fact that the rear flat surfaces of the bumper plates 82 and 104 engage the forward facing flat surfaces of base plates 76 and 94. Although the bending stresses are primarily absorbed by the facing surfaces of the base plates and the bumper plates, the base plates and bumper plates are maintained in pivotal relationship about pivot bars 80 and 99. When the cutter unit is in an unleveled or pivoted attitude with respect to the power unit and the cutter unit is driven into an obstruction, the base plates and bumper plates will still be in abutting overlapped relationship so as to absorb the bending forces applied to the pivotal connection.

While this invention has been described in connection with a power unit that has only driving wheels and no steerable wheels and relies upon the connection with the cutter unit for partial support, it will be understood by those skilled in the art that a similar impact resistant connection can be formed between a cutter unit and a power unit in which the power unit includes both driving wheels and steerable wheels. Moreover, the pivotal connectors have been illustrated with the pivot bars mounted to the power units and the pivot tubes mounted to the cutter units; however, these elements can be mounted in reverse positions, if desired, and other pivot connection structures can be used in combination with the impact resistant features disclosed herein.

Although the invention has been described in the form of preferred embodiments, many modifications, additions, and deletions may be made thereto without departure from the spirit and scope of the invention, as set forth in the following claims.

I claim:

1. In a mower assembly for cutting grass and the like including a self propelled power unit for moving across the ground in a forward direction, a cutter unit positioned in front of said power unit, and pivot mounting means connecting said cutter unit to said power unit about a pivot axis extending forwardly from said power unit so that the cutter unit is pivotable about said pivot axis with respect to said power unit, the improvement therein of a pair of impact resistant means mounted between said power unit and said cutter unit, said pair of impact resistant means each positioned in an array about said pivot axis, one of said impact resistant means comprising a bearing surface mounted on said power unit and the other of said impact resistant means comprising a bearing surface mounted on said cutter unit, said bearing surfaces of each impact resistant means being aligned with each other and extending in an arc about said pivot axis so that said bearing surfaces are movable with respect to each other about said pivot axis while portions thereof remain in alignment with each other, means for maintaining said bearing surfaces of each impact resistant means in abutment with each other and movable with respect to each other while in overlapped sliding relationship when said power unit and said cutter unit pivot with respect to each other about said pivot axis to either side of leveled orientation, whereby during forward movement of the mower should the cutter unit engage to one side of its pivot axis an obstacle in its path the bearing surfaces of the impact resistant means tend to press against each other on the one side of the pivot axis to resist any turning across the pivot axis of the cutter unit with respect to the power unit.

2. The improvement of claim 1 and wherein each of said impact resistant means includes means for limiting the angle of pivot between said power unit and said cutter unit to maintain the bearing surfaces of each impact resistant means in overlapping relationship.

3. The improvement of claim 1 and wherein said pivot mounting means comprises first and second mounts, one of said mounts connected to said power unit and the other of said mounts connected to said cutter unit, said first mount including a tubular member with an internal cylindrical bearing surface extending coaxially with said pivot axis, said second mount including a bar member with an external cylindrical bearing surface received in the bearing surface of said first mount.

4. The improvement of claim 3 and wherein said means for maintaining said bearing surfaces of each impact resistant means in abutment comprises a keeper plate attached to said bar member and engaging said tubular member.

5. The improvement of claim 1 and wherein said means for maintaining said bearing surfaces of each impact resistant means in abutment comprises one of said bearing surfaces of each said impact resistant means defines an arcuate slot therethrough with the axis of the radius of said slot being the pivot axis, and wherein the other one of said bearing surfaces includes a keeper connected thereto and extending through said arcuate slot and shaped to retard movement of said bearing surfaces away from each other.

6. The improvement of claim 1 wherein said cutter unit includes caster wheels on which said cutter unit is supported, said power unit includes powered wheels about which said power unit is supported, with said pivot mounting means holding together said power unit and said cutter unit in erected positions.

7. The improvement of claim 1 and further including caster wheels for supporting said cutter unit from the ground surface, means for adjusting the caster wheels with respect to said cutter unit to change the height at which the cutter unit is supported from the ground surface by said caster wheels, and means for adjusting the height of said pivot mounting means and said impact resistant members on said power unit to change the height at which the cutter unit is supported from the ground surface by said power unit.

8. A self propelled mower for cutting grass and the like comprising a power unit having driven wheel members for moving said power unit across the ground in a forward direction, a cutter unit in front of said power unit including wheels for supporting said cutter unit from the ground, pivot mounting means supporting said power unit and said cutter unit from each other and connecting said power unit to said cutter unit about a pivot axis extending forwardly from said power unit so that said power and said cutter unit are pivotable with respect to each other about said pivot axis, the improvement therein of impact resistant means mounted between said power unit and said cutter and straddling said pivot axis, said impact resistant means including forwardly facing bearing surfaces mounted to said power unit in an array about said pivot axis and rearwardly facing bearing surfaces mounted to said cutter unit and positioned for sliding engagement with said forwardly facing bearing surfaces, and means for limiting the pivoting of said cutter unit and said power unit with respect to each other to a predetermined angle of tilt, said forwardly facing bearing surfaces and said rearwardly facing bearing surfaces being of sufficient size and shape to remain overlapped when said cutter unit and said power unit have been pivoted with respect to each other to the predetermined angle of tilt whereby during forward movement of the mower should the cutter unit abruptly engage an obstacle in its path on one side of the pivot axis at least some of the impact forces transmitted from the cutter unit to the power unit will be transmitted through the impact resistant means.

9. The improvement of claim 8 and wherein said pivot mounting means includes a pivot bar mounted to one of said power unit or cutter unit and a pivot tube surrounding said pivot bar and mounted to the other of said power unit or cutter unit, and wherein one of said bearing surfaces straddle said pivot bar and the other of said bearing surfaces straddle said pivot tube.

10. The improvement of claim 8 and wherein said means for pivoting of said cutter unit and said power unit with respect to each other comprises means carried by said power unit positioned for engagement by said cutter unit when said cutter unit pivots through a predetermined arc with respect to said power unit.

* * * * *